(12) United States Patent
Swanson et al.

(10) Patent No.: US 11,238,278 B1
(45) Date of Patent: Feb. 1, 2022

(54) FILE MATCHING WITH RATIONALE ALIGNMENT USING NEURAL NETWORKS AND AN OPTIMAL TRANSPORT ALGORITHM

(71) Applicant: ASAPP, Inc., New York, NY (US)

(72) Inventors: Kyle Swanson, Bronxville, NY (US); Lili Yu, New York City, NY (US); Tao Lei, Jersey City, NJ (US)

(73) Assignee: ASAPP, Inc., New York, NY (US)

( * ) Notice: Subject to any disclaimer, the term of this patent is extended or adjusted under 35 U.S.C. 154(b) by 275 days.

(21) Appl. No.: 16/706,790

(22) Filed: Dec. 8, 2019

(51) Int. Cl.
*G06K 9/00* (2006.01)
*G06F 16/16* (2019.01)
*G06K 9/62* (2006.01)
*G06N 3/04* (2006.01)

(52) U.S. Cl.
CPC ....... *G06K 9/00483* (2013.01); *G06F 16/168* (2019.01); *G06K 9/00449* (2013.01); *G06K 9/00456* (2013.01); *G06K 9/00463* (2013.01); *G06K 9/6232* (2013.01); *G06N 3/0454* (2013.01)

(58) Field of Classification Search
CPC ............. G06K 9/00483; G06K 9/6232; G06K 9/00463; G06K 9/00456; G06K 9/00449; G06N 3/0454; G06F 16/168
See application file for complete search history.

(56) References Cited

PUBLICATIONS

Sinkhorn, Richard et al., "Concerning Nonnegative Matrices and Doubly Stochastic Matrices", Pacific Journal of Mathematics, vol. 21, No. 2, pp. 343-348, 1967.

Cuturi, Marco "Sinkhorn Distances: Lightspeed Computation of Optimal Transportation Distances", In Advances in Neural Information Processing Systems, pp. 2292-2300, 2013.

Bahdanau, Dzmitry et al., "Neural Machine Translation by Jointly Learning to Align and Translate", International Conference on Learning Representations, 2015.

Martins, Andre F.T., et al., "From Softmax to Sparsemax: A Sparse Model of Attention and Multi-Label Classification", 2016.

Parikh, Ankur P., et al., "A Decomposable Attention Model for Natural Language Inference", 2016.

Li, Jiwei et al., "Understanding Neural Networks through Representation Erasure", 2016.

Xie, Qizhe et al., "An Interpretable Knowledge Transfer Model for Knowledge Base Completion", 2017.

(Continued)

*Primary Examiner* — Jianxun Yang
(74) *Attorney, Agent, or Firm* — Lessani Law Group, PC

(57) ABSTRACT

The present disclosure describes a system, method, and computer program for matching an input file to one of a plurality of datastore files and displaying the rationale for the match. Neural networks are trained to create vector representations of objects in the input file and the datastore files. The cost of each possible pairing of vector representations between the input file and a datastore file is computed, and an optimal transport algorithm is used to identify the vector pairings that result in the lowest total cost of alignment. The datastore file with the lowest total cost of alignment to the input file is identified as the best matching file. The alignment results are used to display the rationale for the match. To constrain the alignment results of the optimal transport algorithm, one or more dummy points and, in certain embodiments, duplicate points are added to one or both of the vector sets to achieve alignments with the desired sparsity patterns.

23 Claims, 3 Drawing Sheets

(56) References Cited

PUBLICATIONS

Lei, Tao et al., "Simple Recurrent Units for Highly Parallelizable Recurrence", Proceedings of the Conference on Empirical Methods in Natural Language Processing, 2018.
Chen, Jianbo et al., "Learning to Explain: An Information-Theoretic Perspective on Model Interpretation", Proceedings of the 35th International Conference on Machine Learning, 2018.
Peyré, Gabriel et al., "Computational Optimal Transport", Foundations and Trends in Machine Learning, vol. 11, No. 5-6, pp. 355-607, 2019.
Alvarez-Melis, David et al., "Towards Robust Interpretability with Self-Explaining Neural Networks", 32nd Conference on Neural Information Processing Systems, 2018.
Chen, Liqun et al., "Adversarial Text Generation via Feature-Mover's Distance", 32nd Conference on Neural Information Processing Systems, 2018.
Xu, Hongteng et al., "Gromov-Wasserstein Learning for Graph Matching and Node Embedding", Proceedings of the 36th International Conference on Machine Learning, 2019.
Jain, Sarthak et al., "Attention is not Explanation", 2019.
Wiegreffe, Sarah et al., "Attention is not not Explanation", 2019.
Chang, Shiyu et al., "A Game Theoretic Approach to Class-wise Selective Rationalization", In Advances in Neural Information Processing Systems, 2019.
Yu, Mo et al., "Rethinking Cooperative Rationalization: Introspective Extraction and Complement Control", Proceedings of the 2019 Conference on Empirical Methods in Natural Language Processing, 2019.
Lei, Tao et al., "Rationalizing Neural Predictions", Proceedings of the 2016 Conference on Empirical Methods in Natural Language Processing, pp. 107-117, Nov. 2016.
Alvarez-Melis, David et al., "Gromov-Wasserstein Alignment of Word Embedding Spaces", Proceedings of the 2018 Conference on Empirical Methods in Natural Language Processing, pp. 1881-1890, Nov. 2018.
Lin, Junyang et al., "Learning When to Concentrate or Divert Attention: Self-Adaptive Attention Temperature for Neural Machine Translation", Proceedings of the 2018 Conference on Empirical Methods in Natural Language Processing, pp. 2985-2990, Nov. 2018.
Kusner, Matt J., et al., "From Word Embeddings to Document Distances", Proceedings of the 32nd International Conference on Machine Learning, vol. 37, ICML'15, pp. 957-966, JMLR.org, 2015.
Bastings, Jasmijn et al., "Interpretable Neural Predictions with Differentiable Binary Variables", Proceedings of the 57th Annual Meeting of the Association for Computational Linguistics, pp. 2963-2977, Aug. 2019.
Bojanowski, Piotr, et al., "Enriching Word Vectors with Subword Information", Transactions of the Association for Computational Linguistics, vol. 5, pp. 135-146, 2017.

FILE MATCHING WITH RATIONALE ALIGNMENT USING NEURAL NETWORKS AND AN OPTIMAL TRANSPORT ALGORITHM

BACKGROUND OF THE INVENTION

1. Field of the Invention

This invention relates generally to file matching using neural networks and, more specifically, to a self-explaining neural network model for file matching.

2. Description of the Background Art

The growing complexity of deep neural networks has given rise to the desire for self-explaining models, which are models that can justify how they reach certain predictions. In the context of natural language processing (NLP) applications, for instance, one popular method is to design text classification models that select and use only a subset of the text when making a prediction. This rationale selection method, often trained to select a small, but sufficient number of text pieces, provides an easy way to validate the model's prediction by examining the selected text.

Unfortunately, very little progress has been made towards the rationalization of file matching tasks (e.g., text matching tasks). File matching, which requires comparing the objects present in the two file documents, encompasses a wide range of applications such as similar document recommendation, question answering, and fake news detection. Many of these applications can benefit from the interpretability provided by rationalization. For instance, consider an application of suggesting similar posts in a tech support forum. If a machine learning algorithm detects two posts as similar, it can present related problem descriptions extracted from the texts, thus providing a better user experience or a feedback loop for domain experts to improve the algorithm.

Rationale selection for file matching introduces a couple of new challenges. First, the selection of objects in one file for matching should be affected by the file to which it is being compared. This is very different from the rationalization method for classification, where selection of objects is performed independently on each file and is dependent on the classification label. Second, in addition to selecting the rationales (i.e., the objects used to make a match prediction), the method should produce an alignment between the rationales of the documents indicating the similarity of each pair of rationales. One possible method for aligning rationales is attention-based models. However, neural attention is rarely sparse, meaning that most pairs of rationales have a non-zero alignment value and are thus difficult to interpret. Moreover, the attention computation is often applied at multiple intermediate layers of the model, interspersed with non-linear operations. As a consequence, the prediction of the model can hardly be attributed to the choice of alignment within an attention layer. Therefore, it is desirable to have an improved method for file matching that enables the selection and alignment of objects that determine a match to be jointly identified and optimized, while also providing guarantees on the sparsity of the optimal alignments.

SUMMARY OF THE DISCLOSURE

The present disclosure describes a system, method, and computer program for matching an input file to one of a plurality of datastore files and displaying the rationale for the match. The method enables the selection and alignment of matching objects within the files to be jointly identified and optimized, while also providing guarantees on the sparsity of the optimal alignments.

The method is performed by a computer system that compares an input file to a plurality of datastore files to identify the datastore file that best matches (i.e., is most similar in content to) the input file. For each input file-datastore file comparison, the system identifies a first set of objects from the input file and a second set of objects from the datastore file. The objects may be words, sentences, paragraphs, images, audio, etc.

The system applies a first neural network to the first set of objects to obtain a first set of vector representations. Likewise, the system applies a second neural network to the second set of objects to obtain a second set of vector representations.

The system constructs a cost matrix that indicates the cost of aligning each possible pairing of first and second set vectors. The system then applies an optimal transport algorithm to the cost matrix to compute the alignment between pairs of vectors that results in the total lowest cost of alignment. The output of the optimal transport algorithm is an alignment matrix for the input file-datastore file pair. The alignment matrix is a matrix whose ij-th entry is the probability that object i in the first vector set is aligned to the jth object in the second vector set.

A simple application of optimal transport often does not produce alignments with sufficient sparsity for interpretability. In order for the alignment to be interpretable, it must be sparse (i.e., very few non-zero alignments relative to the total number of alignments between the two sets of objects). Therefore, the system employs techniques to constrain alignment results and achieve alignments with desired sparsity patterns. These techniques include adding one or more dummy points to one or both of the vectors sets, duplicating points in one or both of the vector sets in certain applications, and using a cost function with the appropriate output value range (e.g., non-negative costs or both negative and positive costs).

A cost matrix and an alignment matrix are created for each input file-datastore file pair. From the cost and alignment matrices for all the pairs, the system is able to identify the datastore file with the lowest total cost of alignment to the input file. For example, file similarity may be assessed based on the inner matrix product of the cost and alignment matrices for each input file-datastore file pair. The datastore file with the lowest total cost of alignment to the input file is considered the best matching datastore file to the input file.

From the alignment matrix corresponding to the input file and the best datastore file match, the system is able to display the rationale for the match. Specifically, the system uses values in the alignment matrix (and, in certain embodiments, the cost matrix) to display an indication of the degree of similarity between objects in the input file and objects in the identified datastore file. The rationale is easily understandable to a viewer due to the sparsity of the alignment matrix, where the sparsity is in turn due to the techniques employed to constrain alignment results (e.g., dummy points, duplicate points, and cost function output value range). Another effect of these techniques, in addition to sparsity, is that all non-zero alignment values are equal, which simplifies interpretability since essentially all pairs of vector either do or do not align. Duplicate points added to the vector sets in certain embodiments also aid in interpretability in those embodiments by controlling precisely the number of alignments (e.g., the k in a one-to-k alignment or an exact-k alignment).

DETAILED DESCRIPTION OF THE PREFERRED EMBODIMENTS

Figure 1:
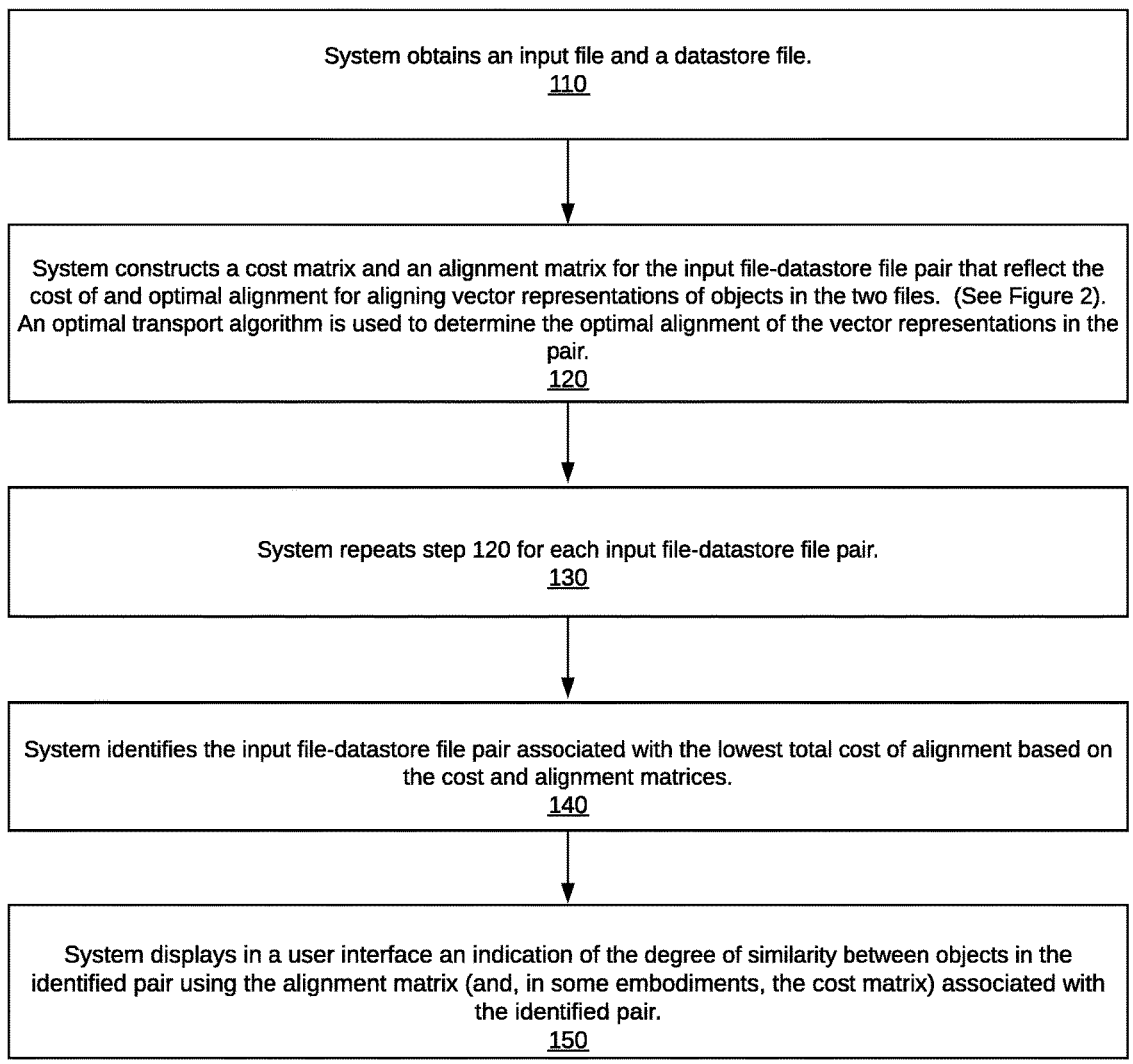
FIG. 1 is a flowchart that illustrates a method, according to one embodiment, for matching an input file to one of a plurality of datastore files and displaying the rationale for the match.

The present disclosure describes a system, method, and computer program for matching an input file to one of a plurality of datastore files and displaying the rationale for the match. The method is performed by a computer system ("the system").

1. Overview

The computer system compares an input file, $F^x$, to a plurality of datastore files to identify the datastore file that best matches the input file. In comparing the input file, $F^x$, to a datastore file, $F^y$, the system creates two sets of objects, $S^x$ and $S^y$, from these files. The objects may be words, sentences, paragraphs, images, or any other chunking of the files.

The system applies a neural network to each set of objects, resulting in the sets of objects being represented by the vectors:

$$X=\{x_i\}_{i=1}^n \{g^x(S_i^x)\}_{i=1}^n \text{ and } Y=\{y_i\}_{i=1}^m \{g^y(S_i^y)\}_{i=1}^m$$

Where $g^x(\cdot)$ and $g^y(\cdot)$ are neural network functions that maps objects to vectors in $\mathbb{R}^d$. The same neural network function may be applied to both sets when the object types are the same in both sets, and a different neural network function is applied to each set when the object types are different in each set.

Let $C: \mathbb{R}^d \times \mathbb{R}^d \to \mathbb{R}$ denote a function which computes the cost of aligning two object embeddings. The system constructs a cost matrix $C \in \mathbb{R}^{n \times m}$ where $C_{i,j} = c(x_i, y_j)$, encapsulating the cost of every object pairing across the two sets.

The system finds an alignment between X and Y to directly assess how much the two files are related. The alignment between X and Y takes the form of a matrix $P \in \mathbb{R}_+^{n \times m}$ where $P_{i,j}$ indicates how much $x_i$ is aligned to $y_j$. In other words, the interpretability of the model is explicitly given by the alignment P.

Since a valid alignment matrix can neither create nor destroy probability mass, the alignment matrix is limited to the set:

$$U(a,b) \stackrel{def}{=} \{P \in \mathbb{R}_+^{n \times m} : P\mathbb{1}_m = a, P^T\mathbb{1}_n = b\},$$

The point sets X and Y are associated with probability distributions $a \in \Sigma_n$ and $b \in \Sigma_m$, respectively, where $\Sigma_n$ is the probability simplex $$\sum_n \stackrel{def}{=} \left\{ p \in \mathbb{R}_+^n : \sum_{i=1}^n p_i = 1 \right\}.$$

The optimal alignment matrix, P*, is a function of the cost matrix, P*=f(C), where f(•) is an optimal transport algorithm. The system assesses document similarity or dissimilarity based on the matrix inner product, $\langle C, P \rangle = \Sigma_{i,j} C_{i,j} P_{i,j}$, which is the total cost of the selected alignment.

A simple application of optimal transport often does not produce alignments with sufficient sparsity for interpretability. In order for the alignment to be interpretable, it must be sparse (i.e., very few non-zero alignments relative to the total number of alignments between the two sets of objects). Therefore, the system employs techniques to constrain alignment results and achieve alignments with desired sparsity patterns. These techniques include adding one or more dummy points to one or both of the vectors sets, duplicating points in one or both of the vector sets in certain applications, and using a cost function with the appropriate output value range (e.g., non-negative costs or both negative and positive costs). The method is described in more detail with respect to FIGS. 1-3.

2. Matching with Rationale Alignment and Desired Sparsity

FIG. 1 illustrates a method for matching an input file to one of a plurality of datastore files and displaying the rationale for the match. The system obtains an input file and a datastore file (step 110). The system constructs a cost matrix and an alignment matrix for the file pair that reflect the cost of and optimal alignment for aligning vector representations of objects in the two files (step 120). This step is described in more detail with respect to FIG. 2.

Figure 2:
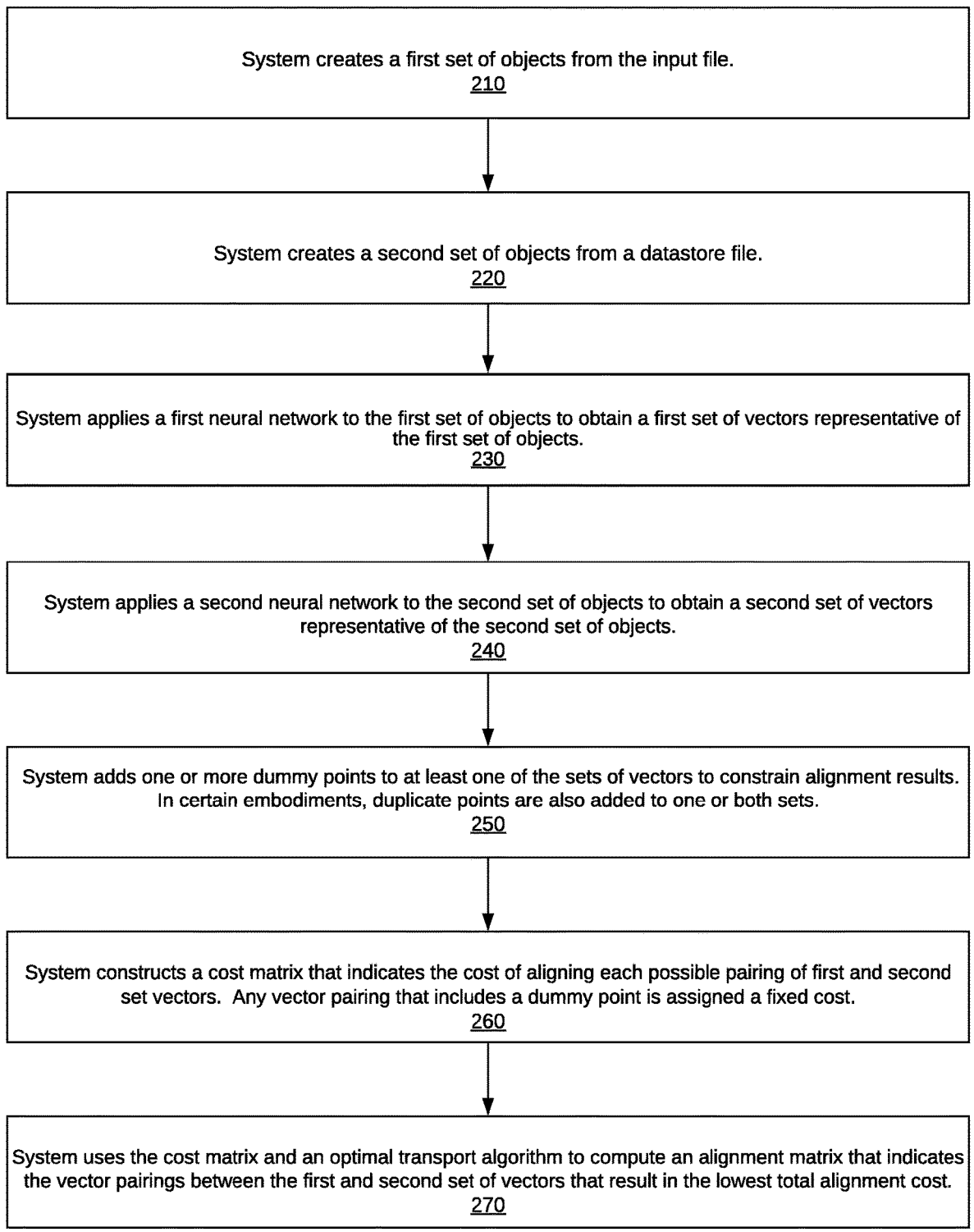
FIG. 2 is a flowchart that illustrates a method, according to one embodiment, for creating a cost matrix and an alignment matrix for an input file-datastore file pair.

Referring to FIG. 2, for each input file-datastore file pair, the system creates a first set of objects from the input file and a second set of objects from the datastore file (step 220). Examples of objects are text spans (e.g., words, phrases, paragraphs, or other chunkings of text), images, and audio clips. The same type of objects may be extracted from both files, or different types may be extracted from each file. For example, text spans may be extracted from both files for text matching applications. Images may be extracted from one file and text from another in applications that match images to text, such as matching an image to a caption.

The system applies a first neural network to the first set of objects to obtain a first set of vectors representative of the first set of objects (step 230). The system applies a second neural network to the second set of objects to obtain a second set of vectors representative of the second set of objects (step 240).

The system adds one or more dummy points to at least one of the sets of vectors to constrain the alignment results (step 250), as is described in more detail below. In certain embodiments, dummy points are added to both sets of vectors. Also, to achieve certain alignment results, points may be duplicated in one or both vector sets, as described in examples below.

The system constructs a cost matrix that indicates the cost of aligning each possible pairing of first and second set vectors (step 260). Constructing the cost matrix comprises computing, for each vector pair having one vector from the first set and another vector from the second set, a cost for aligning the two vectors. Any vector pairing that includes a dummy point is assigned a fixed cost (e.g. zero).

Examples of the types of cost functions that may be used to create the cost matrices include negative cosine similarity, cosine distance, and Euclidean distance. The cost function selected depends on the desired output value range, as the output value range can be used to constrain alignment results. For example, as described in more detail below, certain alignments (e.g., an exact-k alignment) may require that all costs in the cost matrix be greater than or equal to zero. Other alignments may require a cost range that includes both negative and positive costs (e.g., a relaxed one-to-k alignment).

The system uses the cost matrix and an optimal transport algorithm to compute an alignment matrix that indicates the vector pairings between the first and second set of vectors that result in the lowest total alignment cost (step 270). The dummy points added to the cost matrix in step 250 cause the optimal transport algorithm to produce an alignment matrix that is sparser and, therefore, more interpretable than it would otherwise produce without the dummy points. Another effect of adding the dummy nodes, in addition to sparsity, is that all non-zero alignment values are equal, which simplifies interpretability since essentially all pairs of vector either do or do not align. Duplicate points added to the vector sets in certain embodiments also aid in interpretability by controlling precisely the number of alignments (e.g., the k in a one-to-k alignment or an exact-k alignment).

The optimal transport problem can be written as:

$$L_C(a, b) \stackrel{def}{=} \min_{P \in U(a,b)} \langle C, P \rangle = \sum_{i,j} C_{i,j} P_{i,j}$$

Where:
$L_C(a, b)$ represents the cost under the optimal alignment matrix P*
C is the cost matrix;
P is the alignment matrix;
a is the probability distribution on the vector representations of the input file (specifically, $a \in \Sigma_n$ where $\Sigma_n$ is the probability simplex $$\sum_n \stackrel{def}{=} \left\{ p \in \mathbb{R}^n_+ : \sum_{i=1}^n p_i = 1 \right\};$$

b is the probability distribution on the vector representations of the datastore file ($b \in \Sigma_m$).
The alignment matrix is limited to the set $$U(a,b) \stackrel{def}{=} \{P \in \mathbb{R}^{n \times m}_+ : P \mathbb{1}_m = a, P^T \mathbb{1}_n = b\}.$$

The above optimal transport objective requires a cubic order linear program to solve the unregularized problem, which is not computationally-friendly. An entropy-regularized objective that approximate the above objective can be solved much more efficiently. The entropy-regularized objective can be written as follows:

$$L^\epsilon_C(a, b) \stackrel{def}{=} \min_{P \in U(a,b)} \langle C, P \rangle - \epsilon H(P)$$

where H(P) is the entropy of alignment matrix P and $\epsilon \in [0, \infty)$ controls the amount of entropy regulation. For small E, the solution to this objective is a good approximation of the solution to the optimal transport objective above.

The entropy-regularized objective can be solved with the Sinkhorn-Knopp algorithm. Because the Sinkhorn-Knopp algorithm only involves matrix operations, it is especially GPU-friendly, as GPUs are able to perform matrix operations very quickly. The Sinkhorn-Knopp algorithm also is fully differentiable, which makes it possible to use it in conjunction with neural networks and to train the entire model in an end-to-end fashion. Therefore, the Sinkhorn-Knopp algorithm is the preferred optimal transport algorithm for the purposes of this method. The Sinkhorn-Knopp algorithm has a solution in the form P*=diag (u) K diag(v), where $K=e^{-c/\epsilon}$ and $(u,v) \in \mathbb{R}^n_+ \times \mathbb{R}^m_+$. The vectors u and v can be determined using the Sinkhorn-Knopp matrix scaling algorithm, which iteratively computes:

$$u \leftarrow a \oslash Kv \text{ and } u \leftarrow b \oslash K^T u$$

Where Ø denotes element-wise division. In one embodiment, the iterations continue until a fixed point is reached (i.e., u and v do not change further) or a maximum number of iterations is reached The system repeats the above process of creating a cost matrix and an alignment matrix for each input file-datastore file pair (step 130). The system then identifies the input file-datastore file pair associated with the lowest total cost of alignment based on the cost and alignment matrices (step 140). Specifically, the system assesses document similarity or dissimilarity based on the matrix inner product, $\langle C,P \rangle = \Sigma_{i,j} C_{i,j} P_{i,j}$, which is the total cost of the selected alignment. The datastore file in the identified pair is considered the closest match to the input file.

The system displays an indication of the match in a user interface. This includes providing the rationale for the match by displaying in the user interface an indication of the degree of similarity between objects in the identified pair using the alignment matrix associated with the identified pair (step 150). In generating the display, an object having a vector representation that is paired with a dummy point in the alignment matrix is treated as unmatched, thereby increasing the sparsity of the displayed aligned objects. The dummy points do not appear as part of the visualization.

Various graphical elements may be used to indicate the alignment between the objects in the two files. For example, matching sentences in a pair of text documents may be highlighted with the same font color that is different from the font color used in the rest of the document. Font size, lines, and color-coded matrices are other examples of graphical elements that can be used to indicate aligned pairs of objects.

In certain embodiments, the cost matrix is also used in displaying an indication of matching objects. For example, the system may connect matching objects with lines in the user interface, and the color of the line can depend on the cost matrix and the thickness of the line can depend on the alignment matrix.

Figure 3:
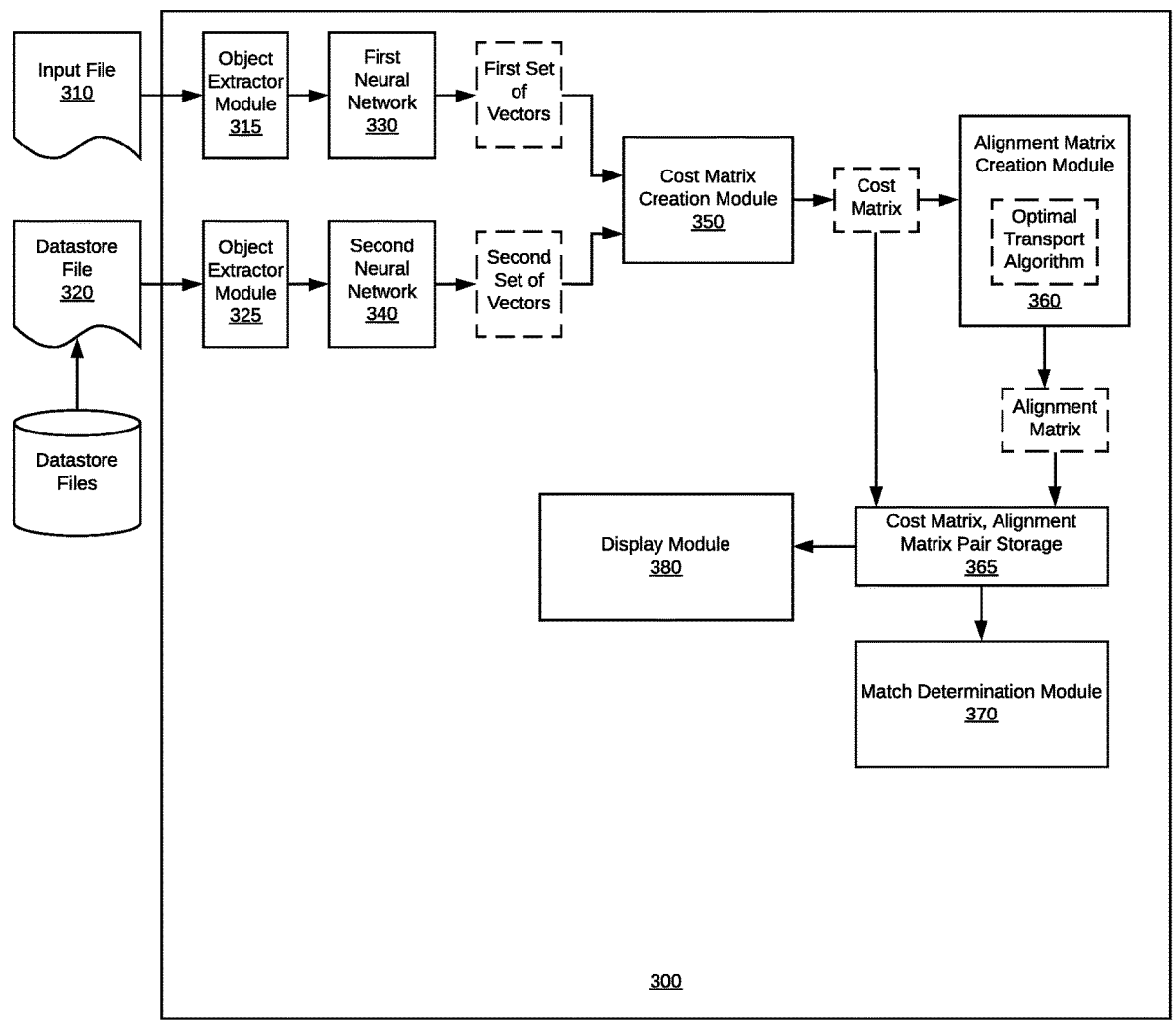
FIG. 3 is a block diagram of an example software architecture.

FIG. 3 illustrates an example system for performing the methods described herein. The methods described herein may be implemented in other systems and are not limited to system 300. A first object extractor module 315 extracts a first set of objects from an input file 310. A first neural network 330 is applied to the first set of objects to obtain a first set of vectors representative of objects in the input file. Likewise, a second object extractor module 325 extracts a second set of objects from a datastore file 320. A second neural network 340 is applied to the second set of objects to obtain a second set of vectors representative of objects in the datastore file. If the object type is the same in both the input file and the datastore file, then the first and second neural networks may be the same. In one embodiment, a recurrent neural network is used for text objects, and a convolutional neural network is used for image objects. The cost matrix creation module 350 creates the cost matrix that reflects the costs of aligning the vector representations of the first and second sets. The alignment creation module 360 creates the alignment matrix using the cost matrix and an optimal transport algorithm. Storage module 365 stores the cost matrix and alignment matrix pairs for each input file-datastore file pair. The match determination module 370 identifies the input file-datastore file pair associated with the lowest total cost of alignment based on the cost and alignment matrices. The display module 380 displays in a user interface an indication of matching objects in the identified pair using the alignment matrix, and, in some embodiments, the cost matrix, associated with the identified pair.

3. Example Ways to Constrain Alignment Results.

The defined output value ranges of the cost function, the number of dummy points and duplicate points added to one or both sets of vectors, and the probability mass assigned to dummy points and embedded objects are variables that can be used to constrain alignment results. For example, these factors may be configured to produce one of the following alignment results:

a one-to-k alignment in which each of the objects in the smaller of the input file and the datastore file matches to k objects in the larger of the files;

a relaxed one-to-k alignment in which each of the objects in the smaller of the input file and the datastore file matches to at most k objects in the larger of the files and may match to no objects in the larger file; and an exact-k alignment in which there are exactly k matches between the objects in the input file and the objects in the datastore file.

This is described in more detail below. In the above, k is an integer greater than or equal to 1, and the size of the files is determined by the number of objects in the file.

3.1 One-to-k Assignment

A one-to-k assignment between two finite sets X and Y, with $|X| \leq |Y|$, is a mapping such that every element X is mapped to exactly k elements of Y, and every element of Y is mapped by at most one element of X. For this example, assume the $|X|=n$ and $|Y|=m$, and k satisfies $k*n \leq m$, meaning $$k \in \left\{1, 2, \ldots, \left\lfloor \frac{m}{n} \right\rfloor \right\}.$$

To obtain a one-to-k assignment, the system sets $\hat{Y}=Y$ and builds $\hat{X}$ with k copies of every point in X along with m−kn dummy points. Since $|\hat{X}|=|\hat{Y}|=m$, applying optimal transport to $\hat{X}$ and $\hat{Y}$ produces a one-to-one assignment between to $\hat{X}$ and $\hat{Y}$. As $\hat{X}$ contains k replicas of each point in X, each unique point in X is mapped to k points in Y, thus producing a one-to-k assignment. The remaining m−kn dummy points are ignored.

3.2 Relaxed One-to-k Assignment

Although the one-to-k assignment provides precise control over the sparsity of the alignment found by the optimal transport algorithm, the requirement that each element of X map to exactly k elements of Y may be overly restrictive for certain applications. In some cases, it may be desirable to have a relaxed assignment, where each point in X is only required to map to at most k points in Y rather than exactly k points.

To obtain a relaxed one-to-k assignment, k replicas are made of each point in X and m dummy points are also added to X and kn dummy points are added to Y, meaning $|\hat{X}|=|\hat{Y}|=m+kn$. At most this will produce a one-to-k assignment between X and Y. However, since there is now one dummy point in $\hat{Y}$ for every non-dummy point in $\hat{X}$, every non-dummy point in $\hat{X}$ has the option of aligning to a dummy point, resulting in a most k alignments to the non-dummy points in $\hat{Y}$. Note that in this case, the cost function must be able to take both negative and positive values to prevent all non-dummy points from mapping to dummy points.

3.3 Exact-k Assignment

For applications where extreme sparsity is required, it may be desirable to specify the exact number of alignments between X and Y. An exact-k assignment maps exactly k points in X to points in Y, where k≤n. This has sparsity k. An exact-k assignment can be constructed by adding m−k dummy points to X and n−k dummy points to Y, meaning $|\hat{X}|=|\hat{Y}|=n+m-k$. In this case, the cost function must be strictly positive so that non-dummy points map to dummy points whenever possible. This leaves exactly k alignments between non-dummy points in X and Y.

3.4 Using Probability Distributions to Constrain Alignment Results

In the above examples, a uniform probability distribution is assumed across both sets of vectors in executing the optimal transport algorithm. Also, in the above examples, alignments are constrained by adding both dummy points and possibly duplicate points to one or both of the vector sets and then running optimal transport on the expanded cost matrix that includes all dummy points and duplicate points. In another embodiment, alignments may be constrained by adding only one dummy point to one or both sets with no duplicate points and then changing the probability distributions used in the optimal transport algorithm in a way that causes the algorithm to behave the same as though multiple dummy points and duplicate points have been added to one or both sets (depending on the constraint desired). For example, if one set has 3 object embeddings and one set has 5 object embeddings and a one-to-k alignment is desired, the system could add one dummy point to the smaller set with a 2/5 probability mass for the dummy point and 1/5 probability mass for the embedded objects. In this case, the optimal transport algorithm would compute the same results as if two dummy points were added to the smaller set with 1/5 probability mass for each dummy point and object embedding.

4. Training the Neural Networks

In one embodiment, negative sampling is used to train the neural networks. The system uses a training dataset of files. A number of pairs of training files in the dataset are labeled as aligned. The system trains the neural networks to minimize an optimal transport distance between vector representations of the file pairs labeled as aligned and to maximize, beyond a fixed margin, the optimal transport distance between vector representations of a random sampling of pairs of files not labeled as aligned.

5. General

The methods described herein are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method for matching an input file to one of a plurality of files in a datastore and displaying the rationale for the match, the method comprising:
   constructing a cost matrix and an alignment matrix for each input file-datastore file pair by performing the following:
      creating a first set of objects from the input file;
      creating a second set of objects from a datastore file;
      applying a first neural network to the first set of objects to obtain a first set of vectors representative of the first set of objects;
      applying a second neural network to the second set of objects to obtain a second set of vectors representative of the second set of objects;
      adding one or more dummy points to at least one of the sets of vectors to constrain alignment results;
      constructing a cost matrix that indicates the cost of aligning each possible pairing of first and second set vectors, wherein constructing the cost matrix comprises computing, for each vector pair having a first vector from the first set of vectors and a second vector from the second set of vectors, a cost for aligning the first and second vectors in the vector pair, and wherein any vector pairing that includes a dummy point is assigned a fixed cost;
      using the cost matrix and an optimal transport algorithm to compute an alignment matrix that indicates the vector pairings between the first and second set of vectors that result in the lowest total alignment cost;
   identifying the input file-datastore file pair associated with the lowest total cost of alignment based on the cost and alignment matrices; and
   displaying in a user interface an indication of matching objects in the identified pair using the alignment matrix associated with the identified pair, wherein an object having a vector representation that is paired with a dummy point in the alignment matrix is treated as unmatched.

2. The method of claim 1, wherein the objects in both the first and second sets of objects are text spans.

3. The method of claim 1, wherein the objects in both the first and second sets of objects are images.

4. The method of claim 1, wherein the objects in one of the sets of objects are images and the objects in the other set of objects are captions.

5. The method of claim 1, wherein one of the sets of objects are audio objects.

6. The method of claim 1, wherein a plurality of dummy points is added to both the first and second sets of vectors.

7. The method of claim 1, wherein the fixed cost is zero cost.

8. The method of claim 1, wherein the cost matrices are creating using a cost function with a defined output value range.

9. The method of claim 8, wherein both the defined output value range for the cost function and the number of dummy points and duplicate points that are added to one or both sets of vectors are configured to constrain alignment results.

10. The method of claim 9, wherein the defined output value range for the cost function and the number of dummy points and duplicate points added to one or both sets of vectors are configured to obtain one of the following alignment results:
   a one-to-k alignment in which each of the objects in the smaller of the input file and datastore file matches to k objects in the larger of the files;
   a relaxed one-to-k alignment in which each of the objects in the smaller of the input file and the datastore file matches to at most k objects in the larger of the files and may match to no objects in the larger file; and
   an exact-k alignment in which there are exactly k matches between the objects in the input file and the objects in the datastore file;
   wherein k is an integer greater than or equal to 1 and wherein the size of the files is determined by the number of objects in the files.

11. The method of claim 8, wherein the cost function used to create the cost matrices is based on one of the following: negative cosine similarity, cosine distance, and Euclidean distance.

12. The method of claim 1, wherein the optimal transport algorithm is the Sinkhorn-Knopp algorithm.

13. The method of claim 1, wherein each of the first and second neural networks are one of the following: a recurrent neural network and a convolutional neural network.

14. The method of claim 1, wherein the displaying steps comprises highlighting the matching objects by using graphical elements in the user interface.

15. The method of claim 14 wherein the graphical elements include one or more of the following: text font color, font size, lines, line width, line color, and color-coded matrices.

16. The method of claim 1, wherein values in both the cost and alignment matrices associated with the identified pair are used to display an indication of the degree of similarity between matching objects in the identified pair.

17. The method of claim 1, wherein the first and second sets of objects are the same type of object, and the first and second neural networks are the same network.

18. The method of claim 1, wherein the first and second neural networks are trained as follows:
   receiving a training dataset of files, wherein a plurality of pairs of the training files are labeled as aligned; and
   training the first and second neural networks to minimize an optimal transport distance between vector representations of the file pairs labeled as aligned and to maximize the optimal transport distance between vector representations of a random sampling of file pairs not labeled as aligned.

19. The method of claim 1, wherein, in the adding step, a plurality of duplicate points is also added to at least one of the sets of vectors to constrain alignment results.

20. A non-transitory computer-readable medium comprising a computer program, that, when executed by a computer system, enables the computer system to perform the following method for matching an input file to one of a plurality of files in a datastore and displaying the rationale for the match, the method comprising:
   constructing a cost matrix and an alignment matrix for each input file-datastore file pair by performing the following:
      creating a first set of objects from the input file;
      creating a second set of objects from a datastore file;
      applying a first neural network to the first set of objects to obtain a first set of vectors representative of the first set of objects;
      applying a second neural network to the second set of objects to obtain a second set of vectors representative of the second set of objects;

adding one or more dummy points to at least one of the sets of vectors to constrain alignment results;

constructing a cost matrix that indicates the cost of aligning each possible pairing of first and second set vectors, wherein constructing the cost matrix comprises computing, for each vector pair having a first vector from the first set of vectors and a second vector from the second set of vectors, a cost for aligning the first and second vectors in the vector pair, and wherein any vector pairing that includes a dummy point is assigned a fixed cost;

using the cost matrix and an optimal transport algorithm to compute an alignment matrix that indicates the vector pairings between the first and second set of vectors that result in the lowest total alignment cost;

identifying the input file-datastore file pair associated with the lowest total cost of alignment based on the cost and alignment matrices; and displaying in a user interface an indication of matching objects in the identified pair using the alignment matrix associated with the identified pair, wherein an object having a vector representation that is paired with a dummy point in the alignment matrix is treated as unmatched.

21. The non-transitory computer-readable medium of claim 20, wherein, in the adding step, a plurality of duplicate points is also added to at least one of the sets of vectors to constrain alignment results.

22. A computer system for matching an input file to one of a plurality of files in a datastore and displaying the rationale for the match, the system comprising:

one or more processors;

one or more memory units coupled to the one or more processors, wherein the one or more memory units store instructions that, when executed by the one or more processors, cause the system to perform the operations of:

constructing a cost matrix and an alignment matrix for each input file-datastore file pair by performing the following:

creating a first set of objects from the input file;

creating a second set of objects from a datastore file;

applying a first neural network to the first set of objects to obtain a first set of vectors representative of the first set of objects;

applying a second neural network to the second set of objects to obtain a second set of vectors representative of the second set of objects;

adding one or more dummy points to at least one of the sets of vectors to constrain alignment results;

constructing a cost matrix that indicates the cost of aligning each possible pairing of first and second set vectors, wherein constructing the cost matrix comprises computing, for each vector pair having a first vector from the first set of vectors and a second vector from the second set of vectors, a cost for aligning the first and second vectors in the vector pair, and wherein any vector pairing that includes a dummy point is assigned a fixed cost;

using the cost matrix and an optimal transport algorithm to compute an alignment matrix that indicates the vector pairings between the first and second set of vectors that result in the lowest total alignment cost;

identifying the input file-datastore file pair associated with the lowest total cost of alignment based on the cost and alignment matrices; and displaying in a user interface an indication of matching objects in the identified pair using the alignment matrix associated with the identified pair, wherein an object having a vector representation that is paired with a dummy point in the alignment matrix is treated as unmatched.

23. The system of claim 22, wherein, in the adding step, a plurality of duplicate points is also added to at least one of the sets of vectors to constrain alignment results.

* * * * *